United States Patent
Ahlfors et al.

(10) Patent No.: US 7,061,868 B1
(45) Date of Patent: Jun. 13, 2006

(54) METHOD FOR FLOW CONTROL IN A SWITCH AND A SWITCH CONTROLLED THEREBY

(75) Inventors: Ulf Ahlfors, Kävlinge (SE); Anders Fyhn, Malmö (SE); Peter Tufvesson, Lund (SE)

(73) Assignee: Switchcore, AB, Lund (SE)

( * ) Notice: Subject to any disclaimer, the term of this patent is extended or adjusted under 35 U.S.C. 154(b) by 865 days.

(21) Appl. No.: 09/697,708

(22) Filed: Oct. 25, 2000

(51) Int. Cl.
H04L 12/26 (2006.01)

(52) U.S. Cl. .................................. 370/236; 370/412

(58) Field of Classification Search ............ 370/229, 370/230, 230.1, 231, 232, 235, 236, 236.1, 370/236.2
See application file for complete search history.

(56) References Cited

U.S. PATENT DOCUMENTS

| | | | |
|---|---|---|---|
| 5,125,096 A | | 6/1992 | Brantley, Jr. et al. |
| 5,189,668 A | * | 2/1993 | Takatori et al. ............ 370/427 |
| 5,493,566 A | | 2/1996 | Ljungberg et al. |
| 5,524,211 A | | 6/1996 | Woods et al. |
| 5,528,591 A | * | 6/1996 | Lauer ........................ 370/231 |
| 5,584,033 A | | 12/1996 | Barrett et al. |
| 5,742,606 A | | 4/1998 | Iliadis et al. |
| 5,774,453 A | | 6/1998 | Fukano et al. |
| 5,905,870 A | | 5/1999 | Mangin et al. |
| 5,995,486 A | * | 11/1999 | Iliadis ........................ 370/229 |
| 6,167,054 A | * | 12/2000 | Simmons et al. ........... 370/422 |
| 6,172,963 B1 | * | 1/2001 | Larsson et al. ............. 370/229 |
| 6,252,849 B1 | * | 6/2001 | Rom et al. .................. 370/230 |

(Continued)

FOREIGN PATENT DOCUMENTS

| | | |
|---|---|---|
| EP | 0 838 972 A2 | 10/1997 |
| EP | 0 853 441 A2 | 11/1997 |
| JP | 3283940 | 12/1991 |
| JP | 04197972 | 7/1992 |
| JP | 07270060 | 10/1995 |

(Continued)

OTHER PUBLICATIONS

Kato, M., et al.: *Performance Analysis of Reactive Congestion Control Based Upon Queue Length Threshold Values*, IEE (1997) (abstract only).

*Primary Examiner*—Steven Nguyen
*Assistant Examiner*—Clemence Han
(74) *Attorney, Agent, or Firm*—Pillsbury Winthrop et al.

(57) ABSTRACT

The invention relates to a method for flow control in a switch and a switch controlled thereby. In order to ensure that no or few packets are dropped in a switch because of a congested internal memory, pause frames or stop command messages are sent to upstream senders. When to send pause frames are determined by monitoring the buffer contents of the switch and estimating the total expected contents of the links between the senders and the switch. The pause frames are sent to the most offending senders, i.e. the senders causing the largest queues in the switch. The switch comprises: a number of input ports, each receiving data cells on a respective link; a number of output ports sharing a buffer space in which each output port can reserve space for an output queue, wherein incoming data cells are switched to an appropriate output queue; a flow control means for pausing and un-pausing senders on selected links; and the method includes the steps of: monitoring the remaining available buffer space AS of the shared buffer; estimating the expected total content LE of the links; calculating a free margin (FM) as the remaining available buffer space minus the expected total content of the links FM=AS−LE. If the free margin sinks below a threshold AS−LE<A, then a selected link is paused; and if the free margin thereafter raises above a threshold AS−LE>B, then a selected paused link is un-paused.

48 Claims, 2 Drawing Sheets

U.S. PATENT DOCUMENTS

| | | | |
|---|---|---|---|
| 6,456,590 B1 * | 9/2002 | Ren et al. | 370/229 |
| 6,628,613 B1 * | 9/2003 | Joung et al. | 370/230 |
| 2001/0043566 A1 * | 11/2001 | Chow | 370/235 |
| 2001/0050913 A1 * | 12/2001 | Chen et al. | 370/360 |
| 2002/0118689 A1 * | 8/2002 | Luijten et al. | 370/411 |

FOREIGN PATENT DOCUMENTS

| | | |
|---|---|---|
| JP | 09212046 | 8/1997 |
| JP | 10107849 | 4/1998 |
| WO | 96/08899 | 3/1996 |
| WO | 99/00949 | 1/1999 |

* cited by examiner

METHOD FOR FLOW CONTROL IN A SWITCH AND A SWITCH CONTROLLED THEREBY

FIELD OF INVENTION

The present invention relates to a method for flow control in a switch and a switch controlled thereby. In order to ensure that no or few packets are dropped in a switch because of a congested internal memory, pause frames or stop command messages are sent to upstream senders. When to send pause frames are determined by monitoring the buffer contents of the switch and estimating the total expected contents of the links between the senders and the switch. The pause frames are sent to the most offending senders, i.e. the senders causing the largest queues in the switch.

STATE OF THE ART

Various problems with a bearing on the present technology have been recognized in the prior art.

The documents WO 96/08899 and U.S. Pat. No. 5,125,096 disclose systems for estimating the expected number of cells arriving to a buffer or a node.

U.S. Pat. Nos. 5,493,566 and 5,905,870 disclose flow control systems using stop messages to selected gateways and buffers.

The present invention is an improvement over the prior art in that the switch does not contain any input port buffer but data cells are switched immediately to queues associated with the output buffers. The internal memory or buffer is shared between the output ports. The remaining available space of the buffer is monitored as well as the estimated contents of the incoming links connected to the switch. Pause commands are sent to the most offending sender on selected links and un-pause commands are sent to the least offending of the paused senders.

The invention can guarantee zero-drop of data cells as well as fairness between the participating senders.

SUMMARY OF THE INVENTION

It is an object of the invention to provide a method for flow control in a switch and a thereby controlled switch in which zero drop can be guaranteed by sending pause commands to the selected most offending sender and sending un-pause commands to the least offending of the paused senders, while non-offending senders are involved as little as possible.

The present invention provides a method for controlling a switch comprising:

a number of input ports, each receiving data cells on a respective link;

a number of output ports sharing a buffer space in which each output port can reserve space for an output queue, wherein incoming data cells are switched to an appropriate output queue;

a flow control means for pausing and un-pausing senders on selected links; the method including the steps of:

monitoring the remaining available buffer space AS of the shared buffer;

estimating the expected total content LE of the links;

calculating a free margin (FM) as the remaining available buffer space minus the expected total content of the links FM=AS−LE;

if the free margin sinks below a threshold AS−LE<A, then a selected link is paused;

if the free margin thereafter raises above a threshold AS−LE>B, then a selected paused link is un-paused.

The present invention also provides a switch operating in accordance with the method.

BRIEF DESCRIPTION OF THE DRAWINGS

The invention will be described in greater detail below with reference to the accompanying drawings, in which.

DETAILED DESCRIPTION OF PREFERRED EMBODIMENTS

Generally, the present invention addresses the problem of ensuring that no data cells are dropped (zero-drop) in a switch having a limited internal buffer space. When the remaining available buffer space of the internal memory approaches the amount of data that may be expected to arrive on the links stop messages or pause frames should be sent to the upstream senders in order to prevent overflow of the internal memory and loss of data.

Figure 1:
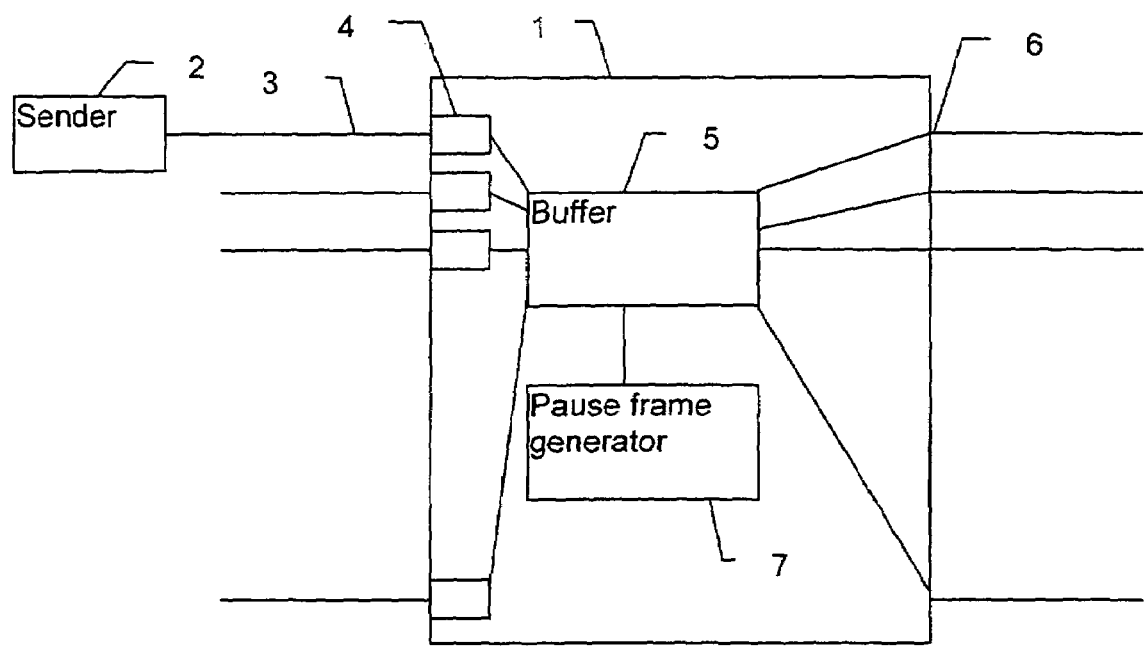
FIG. 1 is a schematic diagram of a switch according to the invention.

FIG. 1 illustrates a switch 1 according to the present invention connected to senders of which only one sender 2 is shown. The sender may be a similar switch or any kind of node. The senders are connected to the switch by a respective link 3. Each link 3 has a specific length and bit rate, which are used as configuration parameters of the switch 1. The data arrives generally in data cells at input ports 4. The data cells are processed and stored in the internal memory or buffer 5 for forwarding to the appropriate output port 6. The output ports 6 share the buffer 5 and each output port may reserve a space to hold an output queue. The switch also includes a flow control means with a pause frame generator 7 to implement the present invention as is described more in detail below.

Figure 2:
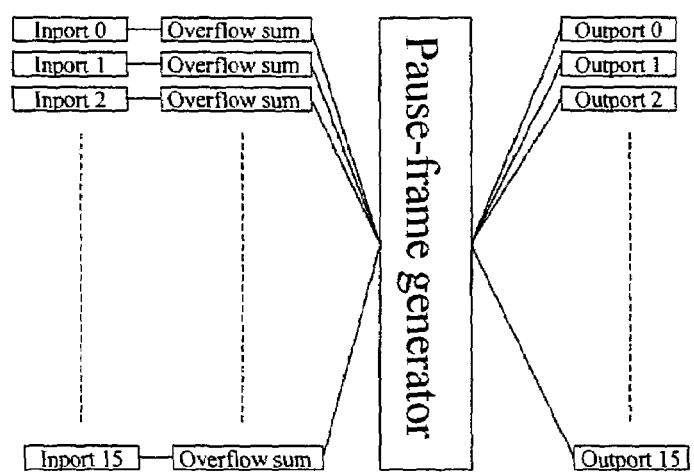
FIG. 2 is a schematic diagram of the pause frame generator and logic connections.

FIG. 2 illustrates the pause frame generator. The pause frame generator is responsible for deciding which input ports are going to send pause frames and when. The reason to pause is to make sure that no packets are ever dropped due to lack of buffer space. This is accomplished by sending pause frames when there is not enough internal memory left to fit the data that might be received during the time it takes the pause to reach the other side, to take effect and to empty the line.

The basic idea is to try to calculate an upper bound of the contents of all links based on their round-trip time and their history of pausing and un-pausing. As soon as the contents exceed the free internal buffer memory we start pausing the input ports, one at a time, and we send pause frames only to those lines that actually use up the internal memory, i.e. those that send packets to congested output ports or ports paused by downstream nodes.

An overflow sum OFS is defined as a sum for each input port 4 of the number of bytes that is sent to congested output ports 6. A port is considered congested when a packet arrives to a queue that is longer than a certain threshold (currently, 24 cells=a full-size packet). Since this variable is of limited size, we have to decrease the counter at some time. There are at least three ways to do this and also preserve the order of the counters:

1. Define a maximum value for the counters. When one counter reaches this maximum, divide all counters by 2.
   This method preserves relative difference;
2. Same as 1., but instead of dividing by 2, subtract the value of the smallest counter from all counters.
   This method preserves absolute difference;
3. Decrease the value linearly with time.
   This method has a limited memory over time.

To increase output port utilization we set the overflow sum to zero when a port is un-paused.

A variable $OFS_{max}$ keeps track of the input port having the largest counter OFS. The purpose of the variable $OFS_{max}$ is to indicate which of the un-paused input ports is to receive the next pause frame.

Similarly, a variable $OFS_{min}$ keeps track of the input port having the smallest counter OFS of all paused input ports. The variable $OFS_{min}$ indicates which of the paused input ports is to receive the next un-pause frame.

The purpose of the pause frame generator is to generate a pause frame at the right time and to send it to the right input port. One problem is to estimate the amount of data in the links. The estimate must, to always be on the safe side, be higher than the actual value and, to be efficient, as close as possible to the actual value. The intention is that the estimate, for each port, should always be higher but never by more than one full-sized packet.

We use a model that consists of a set of links that contain twice as much as the round-trip content plus two full-sized packets (to account for the situation where we have to wait for the pause frame (=one packet) to be sent, and where the pause frame arrived just after the switch started sending a packet (+another packet)). The line is initially full at a maximum value and we try to make an upper bound on the estimate of the contents of this line. The maximum value depends on the length and bit rate of the link.

Figure 3:
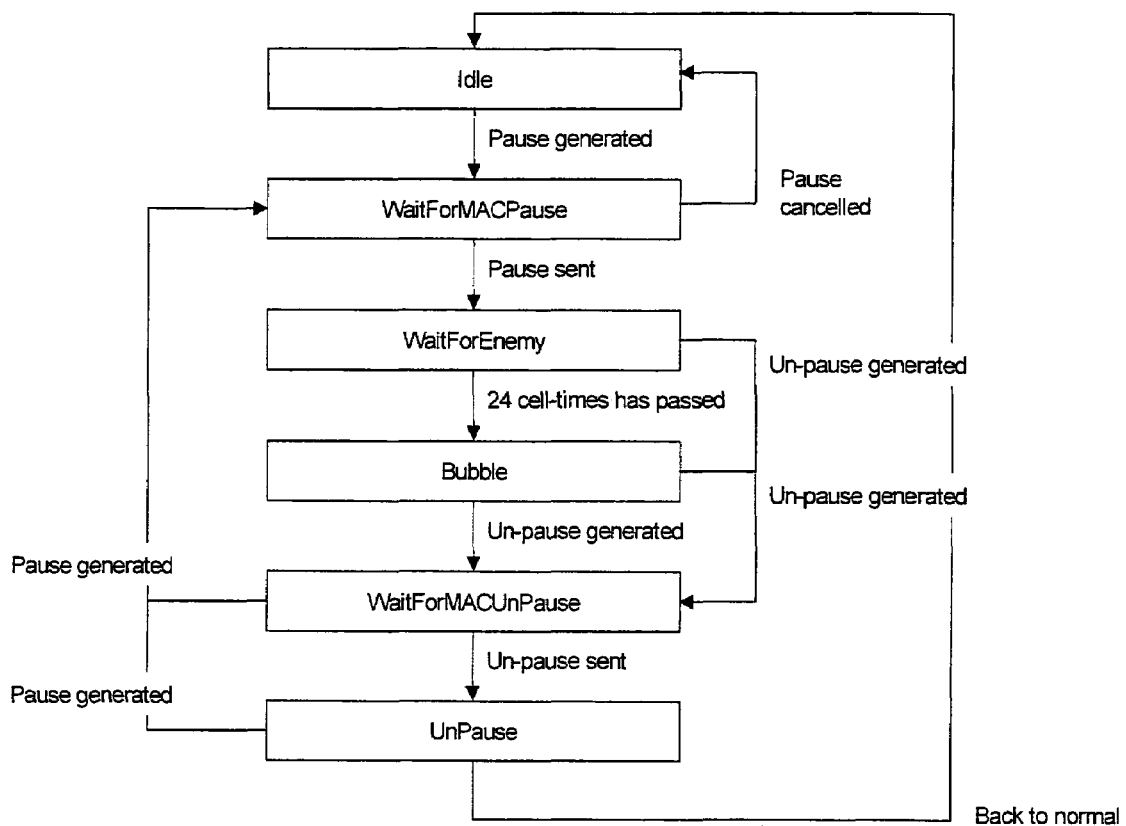
FIG. 3 is a flow diagram of the various states employed in the estimation of link content.

This is accomplished by having every port be in one of six states as shown in FIG. 3:

1. Idle
   Nothing happens, the estimate stays at the maximum value;
2. WaitForMACPause
   A pause frame is waiting to be sent out, the estimate stays the same. This state may have a fixed duration e.g. equal to the time it takes to send a packet from the pause frame (MAC Media Access Control) generator or the process just waits for a signal from the MAC indicating that the pause frame has been sent. This is to take into account that another packet has to be sent before the pause frame;
3. WaitForEnemy
   The pause frame has left the switch, but one full-size packet might be in transit from the other (enemy) side when the pause frame reaches the sender. The estimate stays the same for 24 cell times (=the time to send a full-size packet), because the sender will not interrupt a packet that has begun to be sent;
4. Bubble
   The time to send a full-size packet (24 cell times) has passed since the pause frame left the switch. We can now start to decrease the estimate linearly until it reaches a minimum value and is considered "empty". The slope of the decrease depends on the bit rate of the link when emptying the link. The minimum value equals one full-sized packet left because the link may contain a new packet as soon as an un-pause frame has reached the sender. When the port has reached the minimum amount it just waits to be un-paused and for an un-pause frame to be sent;
5. WaitForMACUnPause
   An un-pause frame is generated and is waiting to be sent out, the estimate stays the same. This state has a fixed duration e.g. equal to the time it takes to send a packet from the pause frame generator or the process just waits for a signal from the MAC indicating that the un-pause frame has been sent.; and
6. UnPause
   The un-pause frame has left the switch, the estimate is increased linearly with time until it reaches the maximum value. The slope of the increase depends on the bit rate of the link.

The reason that we consider the line empty when there is one full-size packet left and that we increase the contents linearly when the actual content increases in steps of the current packet-size is that we want to increase the stability of the algorithm by smoothing the input.

As is shown in FIG. 3, the process does not have to run through the whole cycle each time. If the pause is cancelled in state 2, or an un-pause frame is generated in states 3, 4, or 5, or if a pause frame is generated in states 5 or 6, the current state will be exited immediately and the process will jump to another state as indicated. The link estimate will be calculated in this state with the current value as initial value. For instance, in state 4 (Bubble), an un-pause frame may be generated before the link estimate has reached the minimum amount and will remain at this value during state 5.

Figure 4:
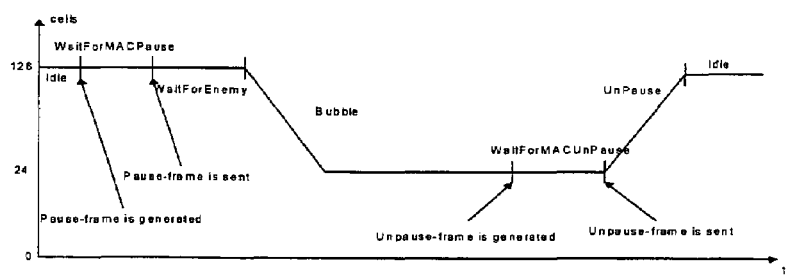
FIG. 4 is a diagram of the curve representing various states of the link estimation according to the present invention.

FIG. 4 illustrates a curve of the estimate in the various states outlined above.

A link estimate is computed for each of the input ports and are added together to form the total amount of data LE (Link Estimate) expected to arrive at the switch. Once we have the estimate of the total content in all ports, we compare it to the free buffer memory. The free buffer memory AS (Available Space) equals the total memory space minus the currently occupied space (and minus any reserved space). This is the space available for storing arriving cells, i.e. available to the output ports.

By subtracting the link content from the available space, we obtain a free margin AS−LE which is left if all the data in transit through the links is stored and no cells are emptied from the memory. In order to guarantee zero-drop, the margin should be equal to (or greater than) zero. The value A=0 is currently preferred. Thus, if AS−LE<A, a pause frame should be sent. In other words, if there is not enough free memory to house the contents of the links we pause the input ports, one by one, until it fits. To spread the burden evenly we always choose to pause the worst offender, the one with the highest overflow sum of the un-paused input ports, i.e. the one that has sent the most bytes to a congested port. This has proven to be perfectly fair in the case where two or more ports each send 100% load to one port.

When the free margin rises above a level B, an un-pause frame should be sent, since the buffer may now fit in more data. The value of B may be equal to A, but a somewhat larger value is preferred so that a smoother operation is obtained. Thus, A≦B. If more than one sender is paused, the un-pause frame is sent to the least offending sender as indicated by the variable $OFS_{min}$ mentioned above.

The strict zero-drop guarantee of the invention is based on the worst-case scenario where all links are filled with maximum length packets directed to the same port that for some reason (pause or collisions) is not being emptied. Since this case is probably not very common, the algorithm will be unnecessary inefficient. It might be possible to increase the efficiency by letting the administrator relax some of the rules. This may be done by setting the threshold A to a negative value. This is done at the cost of losing the zero-drop guarantee, but in most realistic traffic cases this will not be a problem, since only few packets will be dropped. The algorithm will still guarantee perfect fairness between the input ports, in the sense that all links participating in the over-subscription will experience the same pause factor, and none of the links going straight through will receive any pause frames at all.

A person skilled in the art will appreciate that the flow control of the present invention may be obtained in other ways than using the pause frames described in the exemplifying embodiments. A pause frame is considered equal to any type of pause or stop command known in this field. The embodiments discussed above are only intended to be illustrative of the invention. The physical implementation in hardware and software and other embodiments may be devised by those skilled in the art without departing from the spirit and scope of the following claims.

The invention claimed is:

1. A method for controlling a switch comprising:
    a number of input ports, each receiving data cells on a respective link;
    a number of output ports sharing a buffer space in which each output port can reserve space for an output queue, wherein incoming data cells are switched to an appropriate output queue;
    a flow control means for pausing and un-pausing senders on selected links; the method including the steps of:
    monitoring the remaining available buffer space AS of the shared buffer;
    estimating the expected total content LE of the links;
    calculating a free margin (FM) as the remaining available buffer space minus the expected total content of the links FM=AS−LE;
    if the free margin sinks below a threshold AS−LE<A, then a selected link is paused; and
    if the free margin thereafter raises above a threshold AS−LE>B, then a selected paused link is un-paused.

2. A method according to claim 1, wherein the flow control means comprises a pause frame generator for generating pause frames to be sent to data senders in order to pause senders on a selected link, and generating un-pause frames to be sent to data senders in order to un-pause senders on a selected paused link.

3. A method according to claim 2, wherein the content LE of the links is estimated as the sum of the contents of all the input links.

4. A method according to claim 3, wherein the estimation of the content LE of the links takes into account the different link lengths and bit rates.

5. A method according to claim 4, wherein each link estimate is based on a model of the behavior of each port.

6. A method according to claim 5, wherein the model consists of a curve having different segments, each segment reflecting a specific state of the port.

7. A method according to claim 6, wherein the states include:
    a state in which the link is full and contains a maximum amount of data;
    a state in which the port is to be paused and is waiting for a pause frame to be sent and in which the link remains at the maximum amount for a fixed duration or until the pause frame is sent;
    a state in which a pause frame is sent and the port is waiting for a fixed duration to allow a packet to leave the sender, and in which the link remains at the maximum amount;
    a state in which the pause frame has reached the sender and the link content is decreased linearly with time to a minimum amount;
    a state in which the port is to be un-paused and is waiting for an un-pause frame to be sent and in which the link remains constant for a fixed duration; and
    a state in which an un-pause frame is sent and the link content is increased linearly with time to the maximum amount.

8. A method according to claim 7, wherein the maximum amount of data equals twice as much as a round trip content plus two full-sized packets.

9. A method according to claim 7, wherein the minimum amount of data equals one full-sized packet.

10. A method according to claim 7, wherein the slopes of the linear increase and decrease depend on the bit rate of the respective link.

11. A method according to claim 2, wherein the most offending sender is paused first.

12. A method according to claim 2, wherein the least offending sender is un-paused first.

13. A method according to claim 11 or 12, wherein offending senders are detected by means of an overflow sum counter OFS.

14. A method according to claim 13, wherein a counter OFS is associated with each input port, and is increased each time the input port sends a packet to a congested output port.

15. A method according to claim 14, wherein the counter OFS of each input port is increased with the packet length, each time the input port sends a packet to a congested output port.

16. A method according to claim 14, wherein the counter OFS is reset to zero when its associated input port receives an un-pause frame.

17. A method according to claim 14, wherein an output port is considered congested if the queue length thereof exceeds a threshold.

18. A method according to claim 13, wherein all the OFS counters are decreased linearly with time.

19. A method according to claim 1, wherein the threshold A is set to zero (A=0).

20. A method according to claim 1, wherein the threshold A is set to a negative value (A<0).

21. A method according to claim 1, wherein the threshold A is less than or equal to the threshold B (A≦B).

22. A method for controlling a switch comprising: a number of input ports, each receiving data cells on a respective link; a number of output ports sharing a buffer space in which each output port can reserve space for an output queue, wherein incoming data cells are switched to an appropriate output queue; a flow control means for pausing and un-pausing senders on selected links; the method including the steps of:
    monitoring the remaining available buffer space AS of the shared buffer;
    estimating the expected total content LE of the links;
    calculating a free margin (FM) as the remaining available buffer space minus the expected total content of the links FM=AS−LE;

if the free margin sinks below a threshold AS−LE<A, then a selected link is paused;

if the free margin thereafter raises above a threshold AS−LE>B, then a selected paused link is un-paused;

wherein the flow control means comprises a pause frame generator for generating pause frames to be sent to data senders in order to pause senders on a selected link, and generating un-pause frames to be sent to data senders in order to un-pause senders on a selected paused link;

wherein the most offending sender is paused first or wherein the least offending sender is un-paused first;

wherein offending senders are detected by means of an overflow sum counter OFS;

wherein a counter OFS is associated with each input port, and is increased each time the input port sends a packet to a congested output port; and wherein an output port is considered congested if the queue length thereof exceeds a threshold; and wherein the queue length threshold equals a maximum length packet.

23. A method for controlling a switch comprising: a number of input ports, each receiving data cells on a respective link; a number of output ports sharing a buffer space in which each output port can reserve space for an output queue, wherein incoming data cells are switched to an appropriate output queue; a flow control means for pausing and un-pausing senders on selected links; the method including the steps of:

monitoring the remaining available buffer space AS of the shared buffer;

estimating the expected total content LE of the links;

calculating a free margin (FM) as the remaining available buffer space minus the expected total content of the links FM=AS−LE;

if the free margin sinks below a threshold AS−LE<A, then a selected link is paused;

if the free margin thereafter raises above a threshold AS−LE>B, then a selected paused link is un-paused;

wherein the flow control means comprises a pause frame generator for generating pause frames to be sent to data senders in order to pause senders on a selected link, and generating un-pause frames to be sent to data senders in order to un-pause senders on a selected paused link;

wherein the most offending sender is paused first or wherein the least offending sender is un-paused first;

wherein offending senders are detected by means of an overflow sum counter OPS, and wherein a maximum value is defined for the OFS counters, and when one counter reaches this maximum, all counters are divided by 2.

24. A method for controlling a switch comprising: a number of input ports, each receiving data cells on a respective link; a number of output ports sharing a buffer space in which each output port can reserve space for an output queue, wherein incoming data cells are switched to an appropriate output queue; a flow control means for pausing and un-pausing senders on selected links; the method including the steps of:

monitoring the remaining available buffer space AS of the shared buffer;

estimating the expected total content LE of the links;

calculating a free margin (FM) as the remaining available buffer space minus the expected total content of the links FM=AS−LE;

if the free margin sinks below a threshold AS−LE<A, then a selected link is paused;

if the free margin thereafter raises above a threshold AS−LE>B, then a selected paused link is un-paused if the free margin thereafter raises above a threshold AS−LE>B, then a selected paused link is un-paused;

wherein the flow control means comprises a pause frame generator for generating pause frames to be sent to data senders in order to pause senders on a selected link, and generating un-pause frames to be sent to data senders in order to un-pause senders on a selected paused link;

wherein the most offending sender is paused first or wherein the least offending sender is un-paused first;

wherein offending senders are detected by means of an overflow sum counter OFS; and wherein a maximum value is defined for the OFS counters, and when one counter reaches this maximum, the value of the smallest counter is subtracted from all the counters.

25. A switch comprising:

a number of input ports, each receiving data cells on a respective link;

a number of output ports sharing a buffer space in which each output port can reserve space for an output queue, wherein incoming data cells are switched to an appropriate output queue;

a flow control means for pausing and un-pausing senders on selected links; the switch further including means for:

monitoring the remaining available buffer space AS of the shared buffer;

estimating the expected total content LE of the links;

calculating a free margin (FM) as the remaining available buffer space minus the expected total content of the links FM=AS−LE;

wherein the flow control means is arranged to pause a selected link, if the free margin sinks below a threshold AS−LE<A; and to un-pause a selected paused link, if the free margin thereafter raises above a threshold AS−LE>B.

26. A switch according to claim 25, wherein the flow control means comprises a pause frame generator for generating pause frames to be sent to data senders in order to pause senders on a selected link, and generating un-pause frames to be sent to data senders in order to un-pause senders on a selected paused link.

27. A switch according to claim 26, wherein the content LE of the links is estimated as the sum of the contents of all the input links.

28. A switch according to claim 27, wherein the estimation of the content LE of the links takes into account the different link lengths and bit rates.

29. A switch according to claim 28, wherein each link estimate is based on a model of the behavior of each port.

30. A switch according to claim 29, wherein the model consists of a curve having different segments, each segment reflecting a specific state of the port.

31. A switch according to claim 30, wherein the states include:

a state in which the link is full and contains a maximum amount of data;

a state in which the port is to be paused and is waiting for a pause frame to be sent and in which the link remains at the maximum amount for a fixed duration or until the pause fame is sent;

a state in which a pause frame is sent and the port is waiting for a fixed duration to allow a packet to leave the sender, and in which the link remains at the maximum amount;

a state in which the pause frame has reached the sender and the link content is decreased linearly with time to a minimum amount;

a state in which the port is to be un-paused and is waiting for an un-pause frame to be sent and in which the link remains constant for a fixed duration; and a state in which an un-pause frame is sent and the link content is increased linearly with time to the maximum amount.

32. A switch according to claim 31, wherein the maximum amount of data equals twice as much as a round trip content plus two full-sized packets.

33. A switch according to claim 31, wherein the minimum amount of data equals one full-sized packet.

34. A switch according to claim 31, wherein the slopes of the linear increase and decrease depend on the bit rate of the respective link.

35. A switch according to claim 26, wherein the flow control means is arranged to pause the most offending sender first.

36. A switch according to claim 26, wherein the flow control means is arranged to un-pause the least offending sender first.

37. A switch according to claim 35 or 36, wherein the flow control means contain an overflow sum counter OPS to detect offending senders.

38. A switch according to claim 37, wherein a counter OFS is associated with each input port, and is increased each time the input port sends a packet to a congested output port.

39. A switch according to claim 38, wherein the counter OFS of each input port is increased with the packet length, each time the input port sends a packet to a congested output port.

40. A switch according to claim 38, wherein the counter OFS is reset to zero when its associated input port receives an un-pause frame.

41. A switch according to claim 38, wherein an output port is considered congested if the queue length thereof exceeds a threshold.

42. A switch according to claim 37, wherein all the OFS counters are decreased linearly with time.

43. A switch according to claim 25, wherein the threshold A is set to zero (A=0).

44. A switch according to claim 25, wherein the threshold A is set to a negative value ($A \leq 0$).

45. A switch according to claim 25, wherein the threshold A is less than or equal to the threshold B ($A \leq B$).

46. A switch comprising:

a number of input ports, each receiving data cells on a respective link;

a number of output ports sharing a buffer space in which each output port can reserve space for an output queue, wherein incoming data cells are switched to an appropriate output queue;

a flow control means for pausing and un-pausing senders on selected links; the switch further including means for:

monitoring the remaining available buffer space AS of the shared buffer;

estimating the expected total content LE of the links;

calculating a free margin (FM) as the remaining available buffer space minus the expected total content of the links FM=AS−LE;

wherein the flow control means is arranged to pause a selected link, if the free margin sinks below a threshold AS−LE<A; and to un-pause a selected paused link, if the free margin thereafter raises above a threshold AS−LE>B;

wherein the flow control means comprises a pause frame generator for generating pause frames to be sent to data senders in order to pause senders on a selected link, and generating un-pause frames to be sent to data senders in order to un-pause senders on a selected paused link;

wherein the flow control means is arranged to pause the most offending sender first; or wherein the flow control means is arranged to un-pause the least offending sender first;

wherein the flow control means contain an overflow sum counter OFS to detect offending senders;

wherein a counter OFS is associated with each input port, and is increased each time the input port sends a packet to a congested output port;

wherein an output port is considered congested if the queue length thereof exceeds a threshold; and wherein the queue length threshold equals a maximum length packet.

47. A switch comprising:

a number of input ports, each receiving data cells on a respective link;

a number of output ports sharing a buffer space in which each output port can reserve space for an output queue, wherein incoming data cells are switched to an appropriate output queue;

a flow control means for pausing and un-pausing senders on selected links, the switch further including means for:

monitoring the remaining available buffer space AS of the shared buffer;

estimating the expected total content LE of the links;

calculating a free margin (FM) as the remaining available buffer space minus the expected total content of the links FM=AS−LE;

wherein the flow control means is arranged to pause a selected link, if the free margin sinks below a threshold AS−LE<A; and to un-pause a selected paused link, if the free margin thereafter raises above a threshold AS−LE>B;

wherein the flow control means comprises a pause frame generator for generating pause frames to be sent to data senders in order to pause senders on a selected link, and generating un-pause frames to be sent to data senders in order to un-pause senders on a selected paused link;

wherein the flow control means is arranged to pause the most offending sender first, or wherein the flow control means is arranged to un-pause the least offending sender first;

wherein the flow control means contain an overflow sum counter OFS to detect offending senders; and wherein a maximum value is defined for the OFS counters, and when one counter reaches this maximum, all counters are divided by 2.

48. A switch comprising:

a number of input ports, each receiving data cells on a respective link, a number of output orts sharing a buffer space in which each output port can reserve space for an output queue, wherein incoming data cells are switched to an appropriate output queue;

a flow control means for pausing and un-pausing senders on selected links; the switch further including means for:

monitoring the remaining available buffer space AS of the shared buffer;

estimating the expected total content LE of the links;

calculating a free margin (FM) as the remaining available buffer space minus the expected total content of the links FM=AS−LE;

wherein the flow control means is arranged to pause a selected link, if the free margin sinks below a threshold AS−LE<A; and to un-pause a selected paused link, if the free margin thereafter raises above a threshold AS−LE>B;

wherein the flow control means comprises a pause frame generator for generating pause frames to be sent to data senders in order to pause senders on a selected link, and generating un-pause frames to be sent to data senders in order to un-pause senders on a selected paused link;

wherein the flow control means is arranged to pause the most offending sender first; or wherein the flow control means is arranged to un-pause the least offending sender first wherein the flow control means contain an overflow sum counter OFS to detect offending senders; and wherein a maximum value is defined for the OPS counters, and when one counter reaches this maximum, the value of the smallest counter is subtracted from all the counters.

* * * * *